United States Patent [19]
Schmitt et al.

[11] Patent Number: 5,365,415
[45] Date of Patent: Nov. 15, 1994

[54] SNAP-FIT RIGHT ANGLE ADJUSTOR MECHANISM

[75] Inventors: Karl R. Schmitt, Rockford; Douglas E. Pherigo, Loves Park, both of Ill.

[73] Assignee: Textron Inc., Providence, R.I.

[21] Appl. No.: 36,817

[22] Filed: May 5, 1993

[51] Int. Cl.5 .................................. B60Q 1/06
[52] U.S. Cl. ............................... 362/66; 362/422; 362/424
[58] Field of Search ............... 74/89.13; 362/61, 66, 362/80, 421, 422, 424, 428, 273, 284, 289

[56] References Cited

U.S. PATENT DOCUMENTS

| | | | |
|---|---|---|---|
| 4,674,018 | 6/1987 | Ryder et al. | 362/424 |
| 4,893,219 | 1/1990 | Lisak | 362/66 |
| 4,939,945 | 7/1990 | Ryder et al. | 74/89.13 |
| 5,032,964 | 7/1991 | Endo et al. | 362/61 |
| 5,067,052 | 11/1991 | Suzuki et al. | 362/61 |
| 5,121,303 | 9/1992 | Shirai et al. | 362/61 |
| 5,163,746 | 11/1992 | Lisak | 362/66 |
| 5,258,894 | 11/1993 | Bivens | 362/66 |
| 5,260,857 | 11/1993 | Lukkarinen et al. | 362/66 |

Primary Examiner—Stephen F. Husar
Attorney, Agent, or Firm—Trexler, Bushnell, Giangiorgi & Blackstone, Ltd.

[57] ABSTRACT

A simplified adjusting mechanism for adjusting the aiming of a headlamp assembly in automobiles and the like includes a gear encircling a bushing and an adjustor screw that is journaled through the bushing. The adjustor mechanism is snapped into a stationary component of the headlamp assembly and the aiming of the headlamp is manually adjusted by using a drive tool. The adjustor mechanism has a series of indication lines that allow the user to adjust the aiming of the headlamp assembly back to its desired position if the headlamp assembly becomes misaligned.

23 Claims, 4 Drawing Sheets

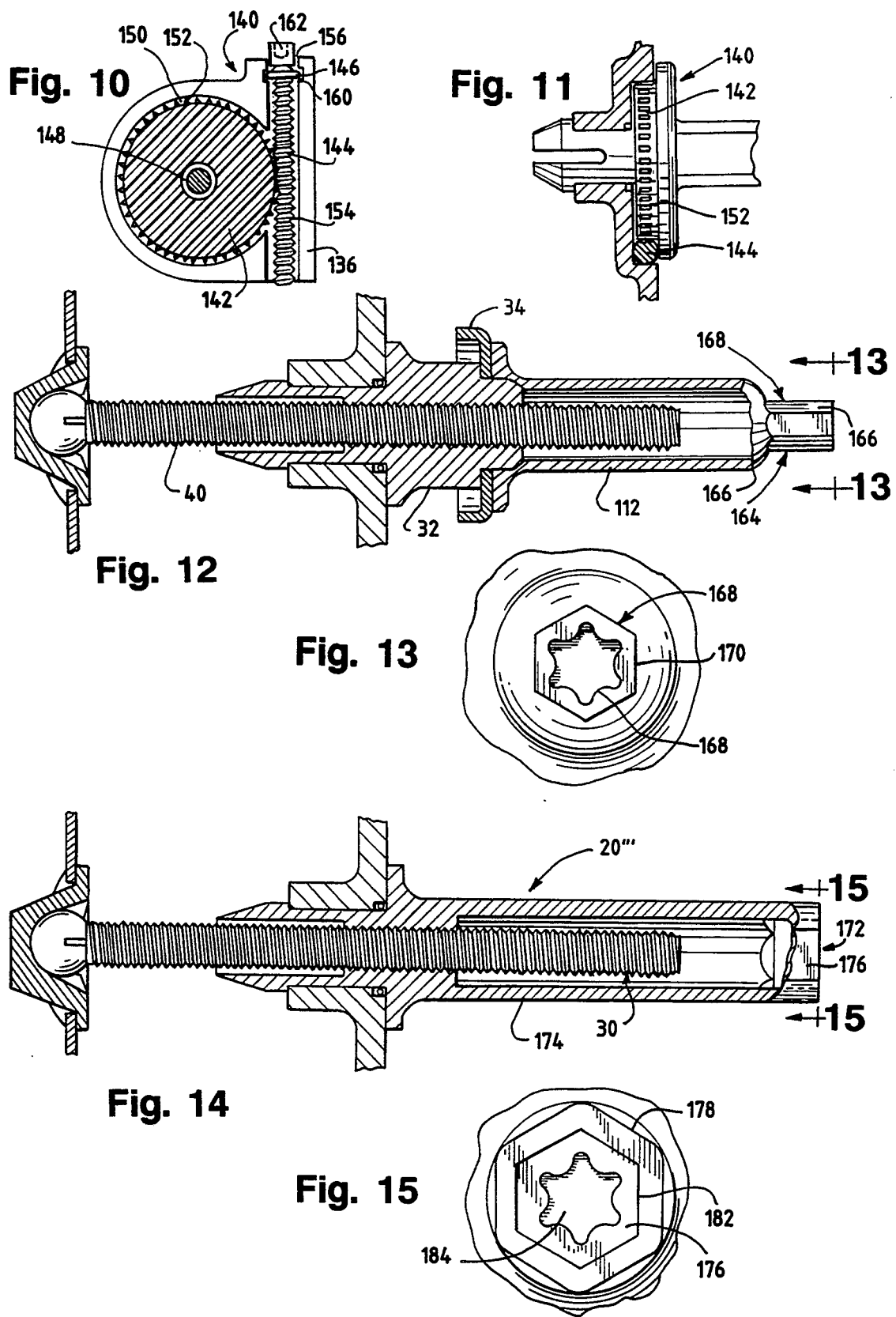

SNAP-FIT RIGHT ANGLE ADJUSTOR MECHANISM

BACKGROUND OF THE INVENTION

The present invention generally relates to mechanisms for adjusting the aiming of a headlamp assembly in automobiles and the like. The invention more specifically relates to a novel adjustor mechanism that can be snapped into a stationary component of the headlamp assembly, and employed to control the position of a relatively movable component, such as the reflector or the entire headlamp housing.

Following assembly of an automobile, the headlamps must be set to their desired position. This is generally accomplished by use of sophisticated photometric metering equipment and manually adjusting the headlamps until the headlamps point in the desired location. Adjustment is usually accomplished by using an adjustor mechanism of the general type and kind to which the present invention relates.

Also, due to vibration or an accident, the headlamps may move out of the desired aiming location. With certain prior art adjustor mechanisms, there is no way to attain the desired initial position or alignment without use of specialized equipment. With the present invention, the initial or "zero" position of the movable headlamp component is indicated and the operator need only adjust the position of the headlamp by using the adjustor mechanism to move the headlamp back to its initial or "zero" position.

Adjustor mechanisms for adjusting the aiming of a headlamp to a desired location are well-known in the art. Examples of an existing prior art adjustor mechanisms can be found in U.S. Pat. Nos. 5,121,303; 5,067,052; 5,032,964; 4,674,018; 4,893,219 and 4,939,945, and generally uses an adjusting screw or a gear box that consists of a pair of gears, a housing, caps, bushing, washer, and adjusting screws or shafts. These mechanisms require several assembly steps and several ultrasonic welding operations which increase the cost of the mechanism.

The present invention comprises an adjusting mechanism for adjusting the aiming of a headlamp assembly in automobiles and the like that has fewer parts and requires fewer steps to assemble. The adjustor mechanism generally includes a bushing that is encircled by a gear and an adjustor screw that is journaled through the bushing. The adjustor mechanism is snapped into a stationary component of the headlamp assembly and the aiming of the headlamp is manually adjusted by using a drive tool. In a preferred embodiment, a series of indicator lines on the adjustor mechanism allow the "zero" or initial position to be indicated and the user to adjust the aim of the headlamp assembly back to the desired position, if the headlamp assembly becomes misaligned for any reason.

OBJECTS AND SUMMARY OF THE INVENTION

A general object of the present invention is to provide an improved means for manually adjusting the aiming of a headlamp.

Another object of the present invention is to provide an improved adjustor mechanism with fewer components than prior art adjustor mechanisms.

It is a further object of the present invention to provide an adjustor mechanism that allows for ease of adjusting by using a visual indication means.

It is a specific object of the present invention to provide an adjustor mechanism that prevents moisture from entering the headlamp assembly.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 10 is a partial sectional view along the line 10—10 in FIG. 9;

FIG. 11 is a partial sectional view along the line 11—11 in FIG. 9;

FIG. 12 is a partial cross-sectional view of an embodiment similar to FIG. 7, and using an additional means of rotating the bushing component;

FIG. 13 is a partial end view of the embodiment shown in FIG. 12;

FIG. 14 is a partial cross-sectional view of yet another embodiment of the present invention using an alternate means of rotating the bushing component, and FIG. 15 is a partial end view of the embodiment shown in FIG. 14.

DETAILED DESCRIPTION OF THE PREFERRED EMBODIMENT

Figure 1:
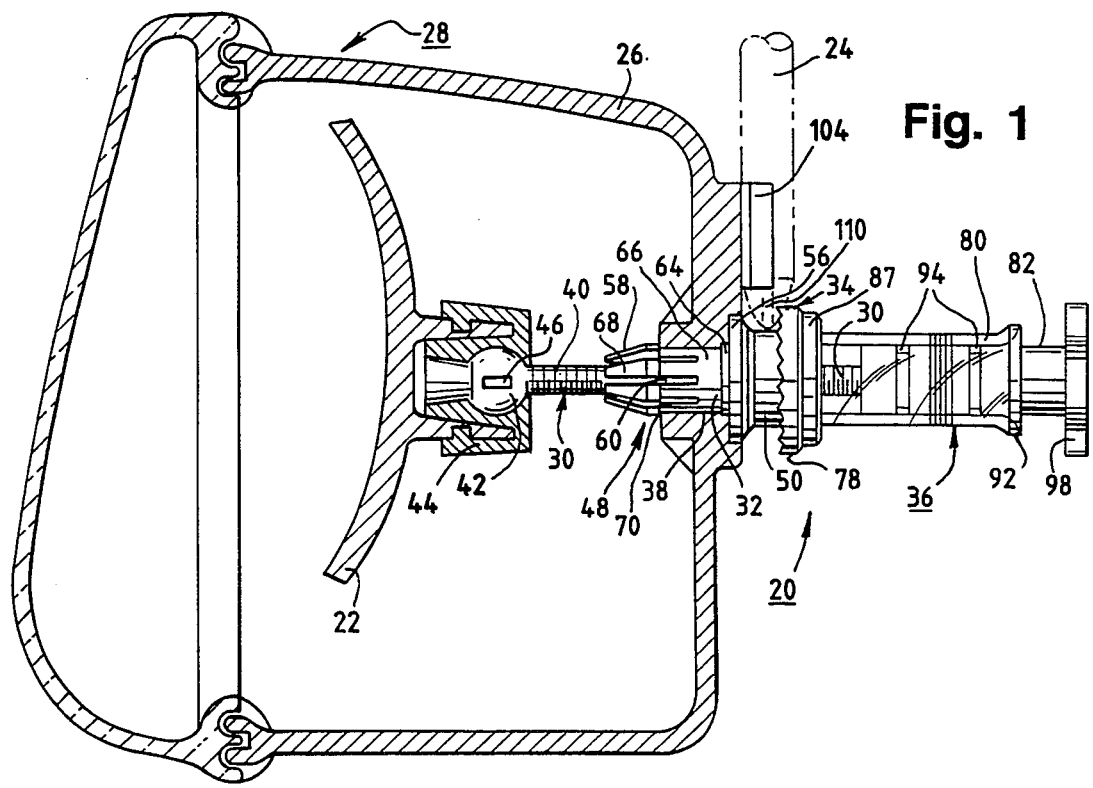
FIG. 1 is a simplified elevational view of a headlamp assembly employing the adjustor mechanism according to an embodiment of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to those as illustrated and described herein.

The adjustor mechanism 20 of the present invention is used to adjust the aiming of a movable headlamp component 22, such as a reflector member or the like. A single adjustor mechanism 20 adjusts the movable component 22 in a horizontal direction, while another similar adjustor mechanism is used to adjust the movable component 22 in a vertical direction (not shown). When the adjustor mechanism 20 is actuated by a suitable drive tool 24, it will pivot the headlamp component 22 about its axis until a desired aiming of the headlamp is achieved as indicated by arrow 23.

In the present invention, the adjustor mechanism 20 is assembled to and inserted through a stationary component 26 of the headlamp assembly 28 such as the headlamp housing and is engaged with the movable component 22 of the assembly, namely the reflector. The adjustor mechanism 20 is generally comprised of an adjusting screw 30, a bushing 32, a gear member 34 and a vial-like indicator assembly 36. One advantage to this adjustor mechanism 20 is that there are fewer parts to manufacture and assemble than prior art adjustor mechanisms. Therefore, lower assembly costs, both in manpower and equipment needed to assemble the mechanism, are achieved while still maintaining the adjustment function of prior art gearboxes.

In the embodiment shown in FIG. 1, the adjustor mechanism 20 is attached to a stationary component 26, the reflector housing, through an aperture 38. By attaching the adjustor mechanism 20 to the reflector housing 26, an ease in manufacturing the reflector housing 26 is achieved since only an aperture 38 needs to be molded into the reflector housing 26. The adjusting screw 30 is engaged with the pivotable component 22, the reflector.

The adjusting screw 30 is comprised of an elongated threaded shaft 40 with a ball portion 42 at an end. The ball 42 is disposed in a socket 44 formed on the pivotable component 22. The ball 42 and socket 44 are complementarily shaped. The ball 42 has fixed ears or nibs 46 in a spaced apart relationship which are fitted into complementary slots or spaces in the socket 44. The engagement of the nibs 46 in said slots causes the ball 42 to be held in the socket 44 and to be fixed against rotation.

The adjustor screw 30 is received within a bushing 32 which is attached to the stationary component 26. The bushing 32 may be and is preferably made of a plastic material by appropriate manufacturing methods such as molding and the like. The bushing 32 is generally comprised of a resilient, nose-like portion 48 made up of a plurality of resilient finger elements and a base 50.

The base 50 is generally cylindrical with an axial bore 52 extending therethrough. The diameter of the bore 52 is slightly smaller than the major diameter of the screw thread on the shaft 40. In the preferred embodiment, initially the bore 52 is smooth and unthreaded. The shaft 40 is inserted into the bore 52 by screwing the threaded shaft 40 into the bore 52 thereby creating or cold forming complementary female threads in the bore 52. This sets up a frictional degree of prevailing torque in the system and insures a tight fit between the bore 52 and the threaded shaft 40 so that the shaft 40 will not easily vibrate out of place during operation of the automobile. It is envisioned, however, that the bore 52 may be initially threaded and the shaft 40 merely rotated into place. One end of the base is a shaped portion 54 and the other end terminates in a flange 56. Both ends 54 and 56 of the base 50 will be described in greater detail herein.

The finger-like projections or portion 48 of the bushing 32 has several elongated extensions or fingers 58 arrayed in a circular configuration with alternating longitudinal slots 60. An opening 62 is included in the center of the arrangement for receiving the threaded shaft 40 therein. The diameter of the opening 62 is preferably larger than the diameter of the adjustor screw 30.

The rear portions 64 of the fingers 58 are connected to the flange 56 on the base 50 of the bushing 32. The back end 64 has a reduced area 66 that is substantially the same diameter and substantially the same length as the aperture 38 in the stationary component 26. Thus, when the bushing 32 is inserted into the aperture 38, the reduced area 66 fits snugly into the aperture 38.

The other end of the fingers 58 is comprised of a partially conical or tapered head 68 having a shoulder 70 at the rearward end of the head 68, which head gradually tapers from back to front. The tapering of the head 68 facilitates the entry of the fingers 58 into the aperture 38 of the stationary component 26.

The fingers 58 are integral with the bushing and are flexible and may be made of a resilient plastic material or the like. The fingers 58 are resilient and are capable of flexing inwardly and then returning to their initial position to in effect provide a snap-fit type of engagement. In order to insert the bushing 32 into the stationary component 26, the fingers 58 are pushed through the stationary component aperture 38. The fingers 58 will flex inwardly a sufficient distance in order to pass through the aperture 38 and then snap back to their original position so that the shoulder 70 and reduced area 66 engage the inner periphery 72 of the aperture 38 once the head 68 of the fingers 58 has passed through. The flange 56 on the base 50 prevents the fingers 58 from moving further into the aperture 38 once the head 68 has cleared the aperture 38 since the flange 56 will abut the stationary component 26. Thus, the adjustor 20 via bushing 32 is effectively snapped into the stationary component 28. The finger 58 permits the bushing 32 to rotate with respect to the stationary component 28, but said bushing 32 and adjustor 20 are fixed against translational movement.

Attached to the shaped portion 54 of the bushing 32 in the embodiment of FIGS. 1–8 is a stamped or die cast, metal gear 34. The gear 34 has circular body 74 with an aperture 76 in the center. Surrounding the outermost extent of the body 74, are a series of teeth 78 which protrude from the gear 34 at a 90° angle from the body 74. In the embodiment shown in FIG. 1, the teeth 78 protrude in the forward direction. It is to be understood, however, that the teeth 78 may also protrude in the rearward direction.

Figure 2:
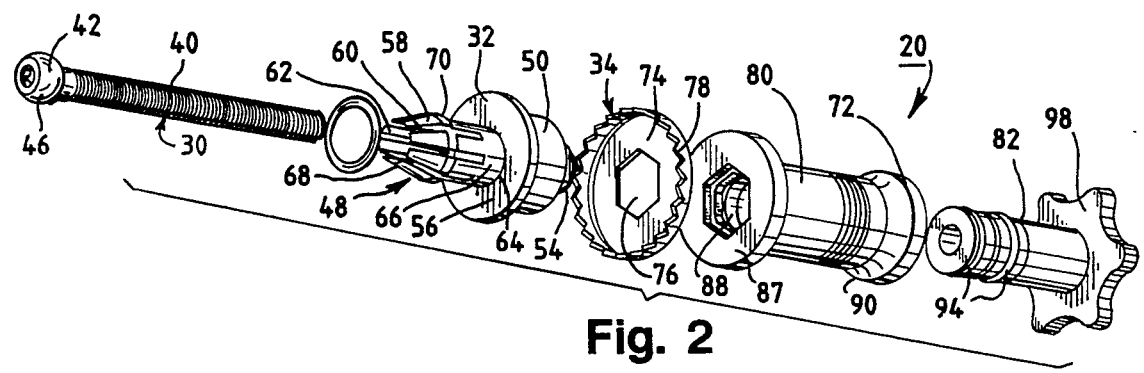
FIG. 2 is an exploded perspective view of the adjustor embodiment shown in FIG. 1.
Figure 3:
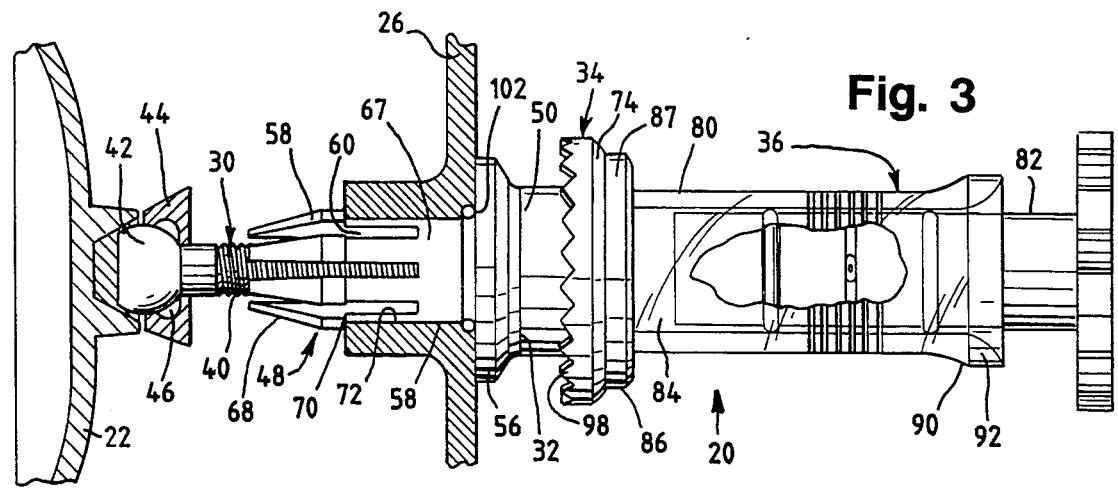
FIG. 3 is a partial sectional view of the assembled adjustor of FIG. 2 with a vial-like indicator portion partially broken away.
Figure 4:
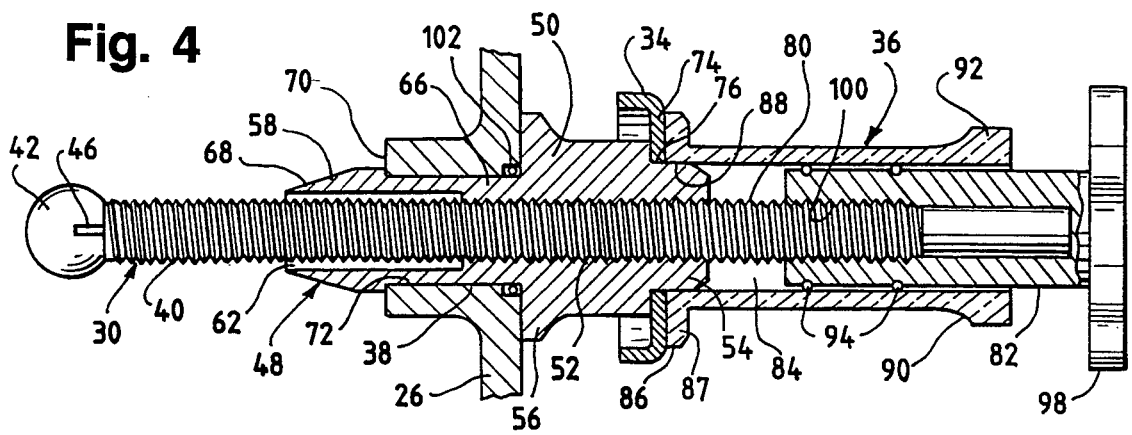
FIG. 4 is a partial cross-sectional view of the adjustor embodiment of FIG. 1.

The shaped portion 54 of the bushing 32 is inserted into the aperture 76 in the center of the gear 34 which has a complementary non-circular shape in order to create a tight fit and fix the gear 34 and bushing 32 against rotation. The shapes of the aperture 76 in the gear 34 and the shaped portion 54 may take any of several forms. In the preferred embodiment, and as shown in FIG. 2, the shaped portion 54 of the bushing 32 and the aperture 76 in the gear 34 are in complementary hexagonal configurations.

Also attached to the shaped portion 54 of the bushing 32 of this embodiment is a vial-like indicator assembly 36. The vial-like indicator assembly 36 is generally comprised of a transparent plastic vial member 80 and a plunger member 82 also made out of a plastic material or the like.

The transparent vial 80 is cylindrical in shape and has a cylindrical portion 83 with a bore 84 extending therethrough. The front end 86 of the vial 80 terminates in a flange 87 which has a shaped aperture 88 that is in a complementary shape to the shaped portion 54 of the bushing 32. The vial 80 is non-rotatably attached to the bushing 32 by an ultrasonic weld or glue. When the vial 80 is ultrasonically welded or glued to the bushing 32, the gear 34 is captured and held into place. This enables the vial 80, the gear 34 and the bushing 32 to maintain a tight fit and to be non-rotatably assembled with respect to each other. The rearward end 90 of the vial terminates in an area 92 of gradually increasing diameter. This enables the user to easily insert the plunger 82 into the vial 80 because the plunger 82 will be able to slide along the area 92 of gradually increasing diameter.

The outside diameter of the plunger 82 is slightly smaller than the inner diameter of the vial cylindrical bore 84 so as to allow the plunger 82 to be free to be moved back and forth within the vial 80. The plunger 82 is frictionally captured in the vial 80 by using several O-rings 94 that encircle the plunger 82 and also contact the vial 80 when the plunger 82 is inserted into the vial 80. The O-rings 94 provide a moisture seal along the vial/plunger interface and also create a degree of friction or prevailing torque in the vial-like assembly 36 and therefore, the plunger 82 will not easily rotate or vibrate out of position during operation of the automobile. The rearward end 96 of the plunger 82 terminates in a shaped handle 98 that the user can grasp in order to move and rotate the plunger 82 to attain the zero position as discussed hereinafter.

The plunger 82 has an internal axial bore 100 that receives the adjustor screw 30. The diameter of the bore 100 is slightly smaller than the outer diameter of the shaft 40 of the adjustor screw 30. In the preferred embodiment, initially the bore 100 is smooth and unthreaded. The shaft 40 is inserted into the bore 100 by rotating the handle 98, thus screwing the threaded shaft 40 into the bore 100 thereby creating complementary female threads in the bore 100. This sets up a prevailing torque in the system and insures a tight fit between the bore 100 and the threaded shaft 40 so that the shaft 40 will not vibrate out of place during operation of the automobile. It is envisioned, however, that the bore 100 may be initially threaded and the shaft 40 merely rotated into place. It should be noted that the plunger 82 can move relative to the adjustor screw 40 and the cylindrical portion 83 of the vial 80 upon rotation of the handle 98. This movement is controlled due to the threaded engagement of the shaft 40 of the adjustor screw 30 with the internal bore 100 of the plunger 82. The purpose and function of this structure will become clear from the discussion to follow concerning use of the indicator portion to provide an indication of the zero position.

A problem that occurs with adjustor mechanisms is that since the adjustor mechanism is attached to the outside of headlamp assembly, it is exposed to outside elements, such as moisture, that could damage the headlamp and its wiring. Furthermore, the adjustor mechanism must be able to pass a water spray or dunk test in order to meet the required standards as set forth in the automotive industry. In order to prevent any moisture from entering the headlamp assembly, appropriate sealing means must be provided within the adjustor mechanism 20 and also between the stationary and movable components and the adjustor mechanism 20. As shown in the figures, several O-rings 94 encircle the plunger 82 in the vial-like indicator assembly 36, as described hereinabove, and maintain a fluid-tight seal between the vial 80 and the plunger 82. Another O-ring 102 encircles the bushing 32 forward of the flange 56 at the point where the adjustor mechanism 20 contacts the stationary housing component 26 in order to maintain a fluid-tight seal between the bushing 32 and the stationary component 26. Therefore, the adjustor mechanism 20 and the headlamp assembly 28 are completely sealed.

An additional feature shown in the embodiment of FIG. 1 is a journal structure 104 for the drive tool 24, which journal structure is located at a distance above the base 50 of the bushing 32 and attached to the reflector housing 26. The journal 104 holds or assists in positioning the drive tool 24 in place during rotation. In the preferred embodiment, the journal 104 is a bifurcated flange in the general form of an arch and is made of a suitable plastic material. Using a bifurcated arch makes the molding process easier due to the ability to use a die without side-pull cords. However, it is to be understood that the journal 104 may be formed as a continuous arch.

Figure 5:
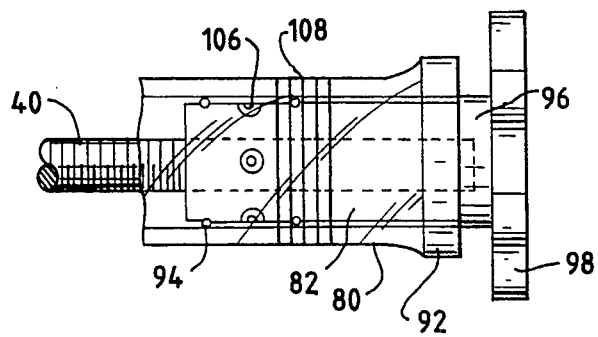
FIG. 5 is a partial view of the vial-like indicator portion of the adjustor mechanism of the present invention illustrating a misaligned position.
Figure 6:
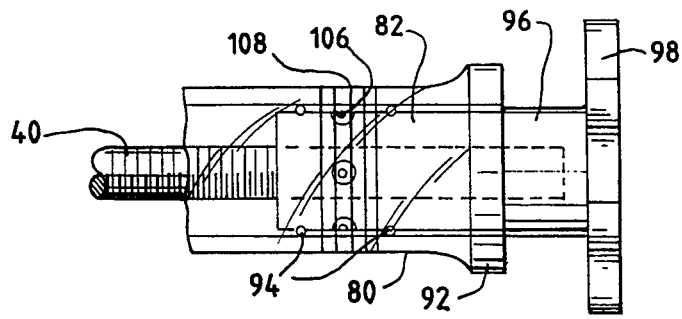
FIG. 6 is a partial view similar to FIG. 5 of the adjustor mechanism of the present invention illustrating an aligned position.

The indicator function of the assembly 36 will now be considered. As will be recalled, after assembly of the automobile, the reflector 22 is moved to the desired or initial position using factory alignment techniques and through operation of the adjustor 20 and movement of the adjustor screw 30 employing the drive tool 24 as illustrated in FIG. 1. When the aligned position is attained, this will generally result in the plunger 82 arriving at an initial position, such as that as illustrated in FIG. 5. In this regard, it should be noted that the plunger 82 is provided with indicia or indicator means 106, while the transparent vial 80 includes zero position indicia 108 which may be flanked by additional indicia as shown. Thus, when the preferred or aligned position for the headlight is attained, it is unlikely that the indicia 106 on the plunger will align with the zero indicia 108 on the vial. Most likely, the condition will be as illustrated in FIG. 5, wherein the indicia 106 is to the left or right of the zero indicator 108, as viewed. At this point, the operator or mechanic will employ the handle 98 to rotate the plunger 82 to cause the plunger to move linearly along the threaded shaft 40 until the plunger indicia 106 is lined up with the zero indicia 108 on the vial. This condition is illustrated in FIG. 6 and represents what is termed the "zero position". Once the zero position is attained, rotation of the plunger 96 stops and is not further employed.

During operation of the vehicle, the headlamp reflector 22 may move out of the desired position due to vibration, accidents or the like. When this occurs, the indicia 106 and 108 will again become misaligned, similar to FIG. 5. When this occurs, and a mechanic desires to adjust the headlamp back to its initial position, he need merely employ a drive tool 24, as shown in FIG. 1, and rotate the gear 34 which in turn will produce rotation of the bushing 50 and linear movement of the adjustor screw 30 due to the fact that the balled end 42 is held against rotation by the engagement of the ears 46 in the slots and the socket on the back of the reflector. Linear movement of the adjustor screw 30 will also produce linear movement of the plunger 82 which is threadedly connected thereto. The operator merely continue to move the adjustor screw and plunger until the indicia 106 again realign with the zero position 108. When this occurs, the mechanic can be relatively assured that the headlamp has been moved back to the initial position.

With regard to the drive tool 24, it should be noted that it is preferred to employ a standard Phillips ® head on the screwdriver which will mate with the teeth 78 on the stamped gear 34. This eliminates the need for expensive and special adjustment tooling, as virtually every mechanic has access to Phillips ® head screwdrivers.

In the embodiments shown in FIGS. 7-15, many of the details of the adjustor mechanism 20 are the same, except for the differences described hereinbelow.

Figure 7:
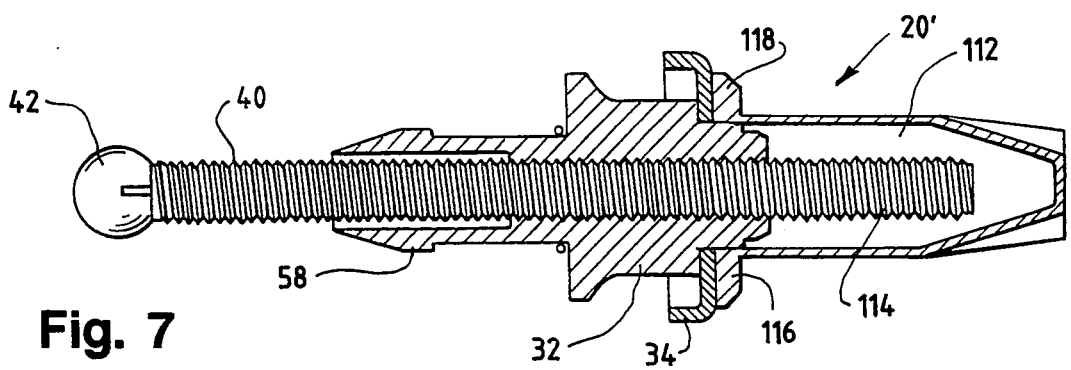
FIG. 7 is a partial cross-sectional view of an alternate embodiment of the present invention which does not include an indicator means.

In the embodiment shown in FIG. 7, the vial-like adjustor assembly 36 of the previous embodiment is replaced with an encapsulator 112 assembly. The encapsulator 112 is a one piece vial that completely encloses the rear end 114 of the adjustor screw 30. The front end 116 of the encapsulator 112 terminates in flange 118 that is similar to the flange 87 of the vial 80 in FIGS. 1-6. The encapsulator 112 is ultrasonically welded or glued to the bushing 32 in the same manner as the vial-like assembly 36 is attached as described hereinabove. The encapsulator 112 may be made of a plastic material and may be transparent. The encapsulator 112 serves to prevent moisture from entering the headlamp assembly 28. As can be appreciated, this design does not provide for recording of the zero positions as discussed above. The adjustor mechanism 20', however, can be assembled to a housing using the snap-fit type of engagement discussed above and provided by fingers 58.

Figure 8:
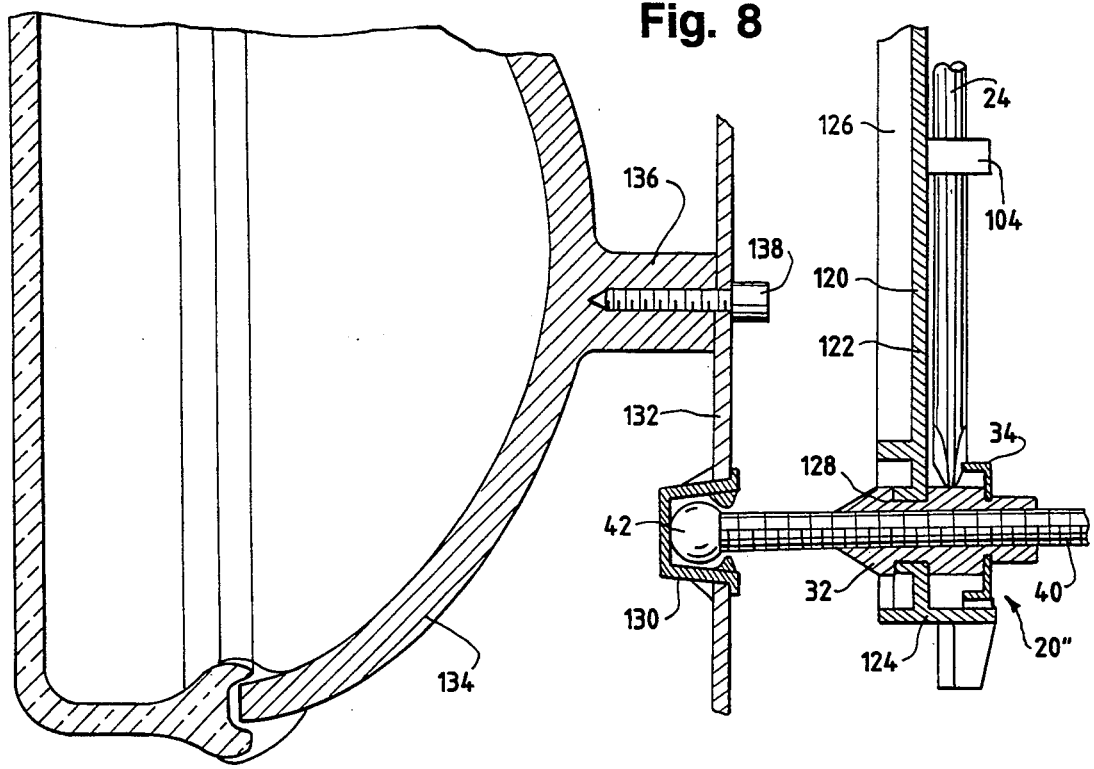
FIG. 8 is a partial plan view of an alternate embodiment of the present invention similar to FIG. 1.

In the embodiment shown in FIG. 8, the adjustor mechanism 20" is employed in an arrangement, wherein the entire headlamp assembly, indicated as 134, pivots. This is in contrast to the FIG. 1 embodiment wherein the assembly 28 is stationary and only the reflector 22 is pivoted. As such, with this embodiment the adjustor mechanism 20" is of similar design and the bushing 32 may be inserted into a stationary bracket 120 instead of the reflector housing 26 as in the embodiment of FIGS. 1-6. In the preferred form, the bracket 120 takes the form of an L-shape having two legs 122 and 124 arranged perpendicularly. It is to be understood that other forms of the bracket 120 may be used. The L-shaped bracket 120 is secured to a frame 126 of an automobile by appropriate means in a manner such that the bracket 120 remains stationary. The L-shaped bracket 120 has an aperture 128, similar to the aperture 38 in the reflector housing 26 of FIGS. 1-6, on one leg 122 of the bracket 120 for accepting the fingers 58 of the bushing 32 as described hereinabove. Thus, the adjustor mechanism 20" can be snapped into the stationary bracket 120 and the mechanism will function in the same manner as described hereinabove.

As also illustrated in FIG. 8, the ball 42 of the adjustor screw 30 may be held in a plastic socket 130 inserted into an opening in the stamping 132 that is secured to a movable headlamp assembly 134. The headlamp assembly 134 is modified to include a flange 136 for attaching the stamping 132 thereto. The stamping 132 is secured to the flange 136 on the movable headlamp assembly 134 by a mounting screw 138 or other appropriate means. Thus, when the mechanic rotates the screwdriver 24, the gear 34 and the bushing 32 are rotated which, in turn, causes the adjustor screw 30 to translate which displaces the position of the stamping 132 thereby causing the headlamp assembly 134 to pivot.

Figure 9:
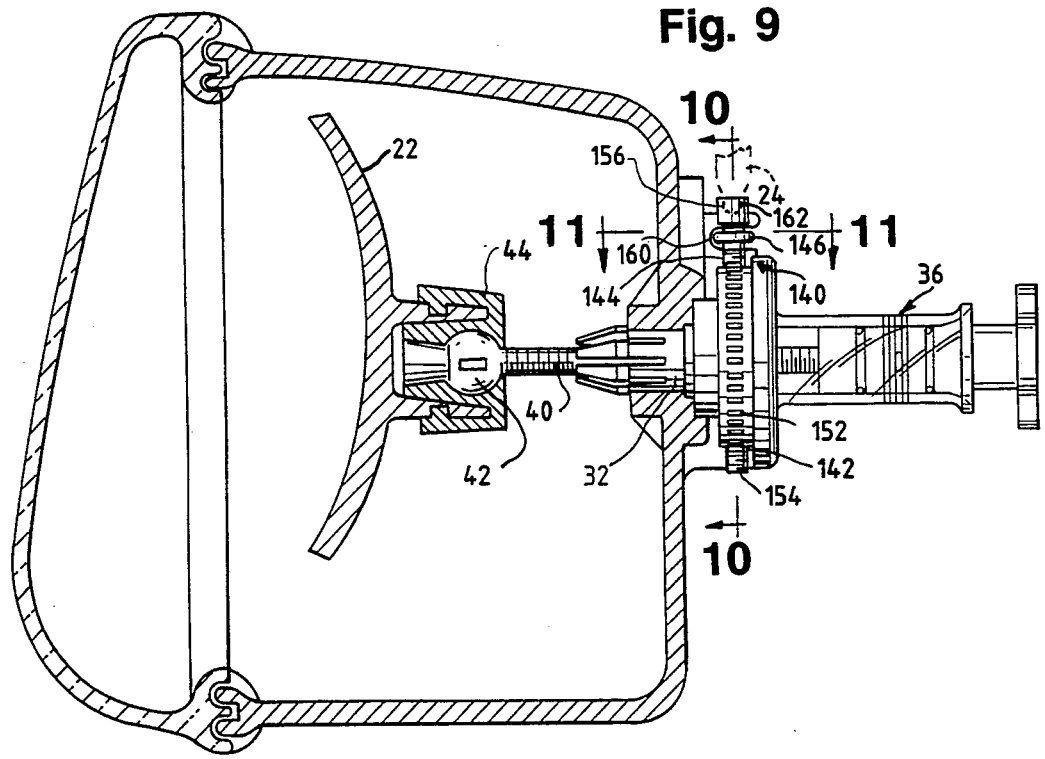
FIG. 9 is a plan view of still another embodiment of the present invention similar to FIG. 1, and using an alternate means of rotating the bushing component.

In the embodiment shown in FIG. 9, a worm gear drive 140 replaces the stamped metal gear 34 and drive tool 24 of FIGS. 1-6. The worm gear assembly 140 is comprised of a worm gear 142 and a worm screw 144. In this embodiment, the reflector housing 26 is modified to include a flange 146 whose function will be described in detail herein.

In this embodiment, the bushing 32 is similar to that as described above, except that the worm gear 142 is formed as an integral part thereof during the molding operation. While a one-piece worm gear and bushing component is contemplated, the elements could be provided by separate components. As shown in FIG. 10, the combination worm gear and bushing has a central aperture indicated at 148 in which the adjustor screw 30 is engaged in a manner similar to that of bore 52 in that bore 50 of the bushing 32 of FIGS. 1-6. The outer edge 150 of the worm gear 142 has a series of teeth 152 for engagement with the spiral thread on screw 144 as described herein.

The worm screw 144, as shown in FIG. 9, consists of a shaft 154 having a spiral thread and a drive head 156 at one end of the shaft 154. A flange 158 is also included between the threaded shaft 154 and the drive head 156. As best shown in FIGS. 9 and 10, the flange 158 and drive head 156 of the worm screw 144 are captively held between the flange 87 on the vial 80 and an aperture 160 in the flange 136 of the reflector housing 26. Thus, the worm screw 144 is held captive against linear movement or removal and can only rotate. The captive drive head 156 has a tool receiving recess 162 in its top-most portion for engagement with a complementary drive tool 24. The design of the recess 162 may take any of several forms and, for example, be designed in order to fit a Torx ® drive tool or a Phillips ® head screwdriver.

In operation, a user engages the drive tool 24 into the recess 162 of the drive head 156. The user then rotates the drive head 162 which, in turn, causes the worm screw 144 to rotate. The worm screw 144 engages the teeth 152 of the worm wheel 142 and imparts rotation to the worm wheel 142 which in turn rotates the bushing 32. The bushing 32 is fixed against translation, as described hereinabove, so translation is imparted to the adjustor screw 30 since the adjustor screw 30 is also fixed against rotation. The adjustor screw 30, in turn, causes the reflector 22 to pivot.

The embodiment shown in FIG. 12 is similar to the adjustment assembly 20' of FIG. 7, described hereinabove, with the addition of an alternative drive means 164. This drive means 164 allows an operator to adjust the assembly from a rearward end 166 of the assembly. The alternative drive means 164 is integral with the rearward end 166 of the encapsulator 112 and includes a drive head 168 that protrudes rearwardly from the end 166 of the encapsulator 112. The drive head 168 is engagable with a complementarily shaped drive tool.

The drive head 168 may take one of many forms. In the preferred embodiment, and as best illustrated in FIG. 13, the outer periphery 170 of the drive head 168 has a hexagonal shape while the inner periphery of the drive head 168 is of a hexlobular design, of the well-known Torx ® drive system. Thus, two different standard drive tools may be used which eliminates the need for special tools.

In operation, the operator engages the drive tool with the drive head 168 and rotates the drive tool which causes the drive head 168, encapsulator 112 and bushing 32 to rotate. This causes the adjustor screw 40 to translate and the reflector 22 to pivot as described hereinabove.

The embodiment shown in FIG. 14, illustrates another assembly 20'" that can be adjusted from a rearward end 172 of the assembly 20'". The gear 34 of FIG. 1 has been eliminated in order to allow the bushing 32 and the vial 80 to be integral with each other. This forms elongate bushing 174 which extends beyond the rearmost end of the adjustor screw 30. The plunger 82 is replaced by a plug 176 thereby eliminating the need for the area of gradually increasing diameter 92. The indicia function of FIG. 1 has also been eliminated.

In the preferred embodiment, and as best shown in FIG. 15, the outer periphery 178 of the elongate bushing's rear end 180 is of a hexagonal shape which is engagable with a complementarily shaped drive tool. Upon rotation of the drive tool by an operator, the elongate bushing 174 is rotated thereby causing the adjustor screw 30 to rotate which causes the reflector 22 to pivot as described hereinabove. It is to be understood that the outer periphery 178 of the rear end 180 may be of other shapes.

The inner periphery 182 of the elongate bushing's rear end 180 is also of a hexagonal shape in the preferred embodiment and is fitted with a complementarily shaped plug 176. The hexagonal shapes will prevent the plug 176 from rotating inside the elongate bushing's rear end 180. Again, it is to be understood that the inner periphery 182 and the plug 176 may take other shapes.

The plug 176 is made of a plastic material and is bonded, by suitable means such as glue, into the rear end 180 after the initial molding of the assembly 20''' is completed. The plug 176 seals the end of the elongate bushing 174 so that moisture may not enter the assembly 20'''. The plug 176 has a tool receiving recess 184 molded into its center in order to allow the operator to engage a complementarily shaped tool to pivot the reflector 22 as described hereinabove. The recess 184 may take one of many shapes, and in the preferred embodiment a Torx ® shape is used.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. An adjustment assembly for use in an automotive headlamp arrangement to permit pivotal motion of a movable headlamp component, such as a reflector member or the like, wherein the adjustment assembly is adapted to be mounted to a stationary component of the overall headlamp arrangement, to effect pivotal motion of said movable component through which aiming of the headlamp beam is attained, said adjustment assembly comprising: an adjuster screw member having an elongate threaded shank and having one end adapted for operable engagement with the movable component, means for preventing relative rotation of said adjuster screw member, a bushing member adapted to be rotatably engaged in an aperture formed in said stationary component, snap-fit means on said bushing for attaining said rotatable engagement in said aperture, said bushing including an axial bore in which said threaded shank of said adjuster screw member is operatively engaged, a gear member non-rotatably secured to said bushing and including means thereon for engagement by a drive member such that upon rotation of the drive member, rotation is imparted to said bushing by said gear member which will drive said adjustment screw linearly due to the non-rotatable mounting of said adjustment screw, which linear movement can be used to adjust the position of said movable component.

2. An adjustment assembly according to claim 1, further including means for sealing said bushing with respect to said stationary component aperture.

3. An adjustment assembly according to claim 2, wherein said means for sealing said bushing with respect to the stationary component includes a seal member carried by said bushing which is engaged directly with said stationary component aperture to seal the interface between said bushing and said stationary component aperture from the entry of moisture into said stationary component.

4. An adjustment assembly according to claim 2, wherein said means for sealing said bushing includes a vial member affixed to a rear portion of said bushing to overlie and encompass the end of said adjusting screw, thereby preventing the entry of moisture into said stationary component along the interface of said adjusting screw and the bushing bore.

5. An adjustment assembly according to claim 4, wherein said vial includes drive means affixed to a rear portion of said vial for engagement with a drive member such that upon rotation of the drive member, rotation is imparted to said vial and said bushing by said drive means which will drive said adjustment screw linearly due to the non-rotatable mounting of said adjustment screw, which linear movement can be used to adjust the position of said movable component.

6. An adjustment assembly according to claim 5, wherein said drive means includes a drive head for engagement with a complementarily shaped drive tool.

7. An adjustment assembly according to claim 6, wherein said drive head has a hexagonal shape.

8. An adjustment assembly according to claim 6, wherein said drive tool is a standard Torx ® type drive tool.

9. An adjustment assembly according to claim 1, wherein said snap-fit means includes a plurality of flexible fingers disposed about the bore of said bushing and extending axially such that said fingers may enter the interior of said stationary component through said stationary component aperture, said fingers including means for engaging the inner periphery of said stationary component aperture to maintain said bushing in rotatable mounting to said stationary component bore.

10. An adjustment assembly according to claim 9, wherein said fingers may flex to enter said aperture and will return to their original position to engage the inner periphery of said aperture, with said adjusting screw being disposed radially inward of said fingers to maintain said fingers in engagement with said inner aperture in the assembled condition.

11. An adjustment assembly according to claim 1, further including in combination therewith, a drive member.

12. An adjustment assembly according to claim 11, wherein said drive member includes a Phillips type drive tool bit captively mounted to said stationary component and having the driving end thereof engaged with the gear member means for engagement, said drive member further including means for engagement thereof by a second drive tool.

13. An adjustment assembly according to claim 11, wherein said drive member is a worm gear captively mounted to said stationary component for engagement with the gear member means for engagement.

14. An adjustment assembly according to claim 1, wherein said gear member means for engagement is adapted to be engaged by a standard Phillips type drive tool, such that rotation of said drive tool when engaged with said gear member means for engagement will produce rotation of said gear member, and means for journaling and supporting said drive tool.

15. An adjustment assembly according to claim 14, wherein said means for journaling and supporting said drive tool comprises a bifurcated flange member on said apertured stationary component.

16. An adjustment assembly according to claim 1, further including zero adjustment means, which is adapted to provide an indication of a selected position for said movable component and also provide an indication of a variance therefrom, such that said adjustment assembly may be operated to return the movable component to the desired position.

17. An adjustment assembly according to claim 16, wherein said zero adjustment means comprises a transparent vial like component affixed to said bushing and rotatable therewith, said vial like component extending over and encompassing the end of said adjustment screw, and having indicia thereon, said vial like component further including an open end portion, an indicator member disposed in the open end of said vial like component and adjustably engaged with said adjustment screw, said indicator member having additional indicia thereon alignable with the indicia on said vial upon selective positioning thereof to provide an indication of a zero position, such that upon operation of said adjustment assembly to effect linear movement of said adjusting screw, said indicator member can be moved such that the indicia thereon will move relative to the indicia on said vial component to provide an indication of relative positioning.

18. An adjustment assembly according to claim 17, further including sealing means provided to seal the interface between said vial and said indicator member to prevent the entry of moisture.

19. An adjustment assembly for use in an automotive headlamp arrangement to permit pivotal motion of a movable headlamp component, such as a reflector member or the like, wherein the adjustment assembly is adapted to be mounted to a stationary component of the overall headlamp arrangement, to effect pivotal motion of said movable component through which aiming of the headlamp beam is attained, said adjustment assembly comprising: an adjuster screw member having an elongate threaded shank and having one end adapted for operable engagement with the movable component, means for preventing relative rotation of said adjuster screw member, a bushing member adapted to be rotatably engaged in an aperture formed in said stationary component, snap-fit means on said bushing for attaining said rotatable engagement in said aperture, said bushing including an axial bore in which said threaded shank of said adjuster screw member is operatively engaged, said bushing further including drive means on a rearward end of said bushing for engagement by a drive member such that upon rotation of the drive member, rotation is imparted to said bushing which will drive said adjustment screw linearly due to the non-rotatable mounting of said adjustment screw, which linear movement can be used to adjust the position of said movable component.

20. An adjustment assembly according to claim 19, wherein said drive means is a drive head that is engagable with a complementarily shaped drive tool.

21. An adjustment assembly according to claim 20, wherein said drive head has a hexagonal shape.

22. An adjustment assembly according to claim 19, wherein said drive means is a plug non-rotatably secured to the rear end of said bushing.

23. An adjustment assembly according to claim 22, wherein said plug is engagable with a standard type Torx® drive tool.

* * * * *